UNITED STATES PATENT OFFICE.

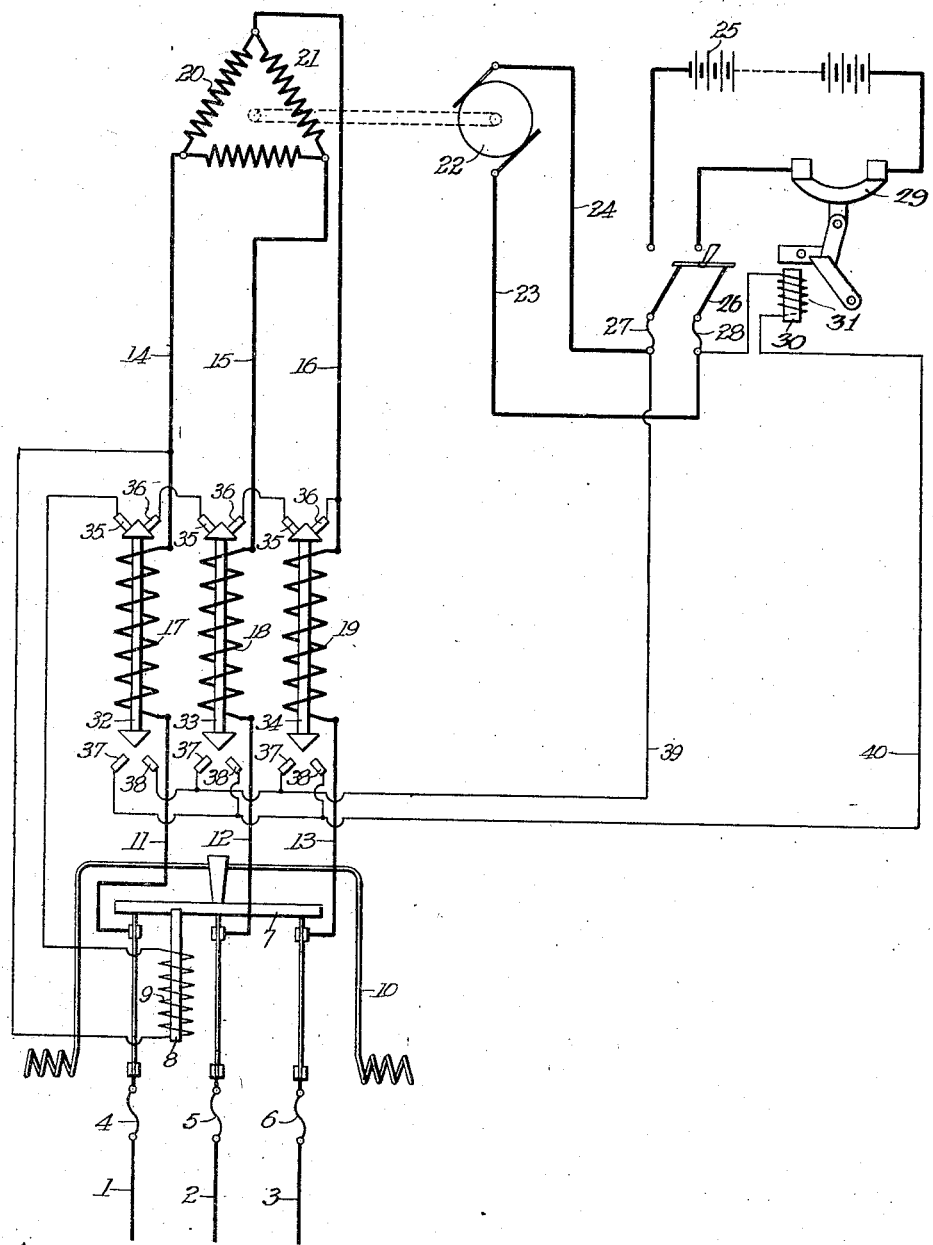

NELS JOLEEN, OF CHICAGO, ILLINOIS, ASSIGNOR TO ASSOCIATED ENGINEERS COMPANY, OF CHICAGO, ILLINOIS.

PROTECTIVE DEVICE FOR THREE-PHASE MOTORS.

1,169,723.  Specification of Letters Patent.  Patented Jan. 25, 1916.

Application filed May 12, 1913. Serial No. 767,046.

*To all whom it may concern:*

Be it known that I, NELS JOLEEN, a citizen of the United States, residing at Chicago, in the county of Cook and State of Illinois, have invented a certain new and useful Improvement in Protective Devices for Three-Phase Motors, of which the following is a full, clear, concise, and exact description, reference being had to the accompanying drawings, forming a part of this specification.

My invention relates to protective devices for three phase motors and has for its object the provision of a reliable device for cutting off a current consuming device in case of failure (either momentary or otherwise) of the source of supply. It is for instance applicable in connection with motor generators used for charging storage batteries. In this case it is very desirable to immediately disconnect the generator in case of interruption of the supply service to which the motor is connected, as otherwise the storage batteries will run the generator as a motor and thus discharge themselves. My invention is particularly arranged to care for this condition on multiphase circuits and will disconnect the desired circuit upon failure of current in either leg of a three phase circuit, for instance. The invention also of course is of value should the current in any branch of a three phase circuit fail, for instance, to then prevent certain motors driving a mechanical load from being run by the remaining phase or phases which might very frequently cause them to be burned out.

I will explain one form which my invention may take as applied more particularly to a motor generator protective device, in connection with the accompanying drawing diagrammatically illustrating the same.

In this drawing I show service supply mains 1, 2 and 3 which through the interposition of fuses 4, 5 and 6 lead to a switch 7, which switch is normally held in place by a catch 8 when there is current in the coil 9. A spring 10 tends to open this switch 7 but is prevented from doing so so long as the detent 8 is held in position when the coil 9 is energized. The switch 7 continues the circuit to conductors 11, 12 and 13, when the switch is closed, and these conductors are respectively continued to conductors 14, 15 and 16 through the interposition of certain coils 17, 18 and 19 whose purpose is to be presently explained. The conductors 14, 15 and 16 as shown connect to the winding 20 of a motor generator set 21, whose generator portion 22 supplies current through the conductors 23 and 24 to charge the storage batteries 25, an ordinary switch 26 being interposed together with fuses 27 and 28. A circuit breaker 29 is also interposed which is normally held closed by a detent 30 except when this detent is retracted by the coil 31 being energized. The energization of the coil 31 retracts this detent 30 and opens the circuit of the generator 22. The coils 17, 18 and 19 respectively control plungers 32, 33 and 34, which plungers are each adapted to close a local circuit when the coils 17, 18 and 19 are energized and also to close a circuit when these coils are deënergized. When the coils are energized the plungers 32, 33 and 34 each close circuit through contacts 35, 36, and when the coils are deënergized they close contact through contacts 37 and 38. The contacts 35, 36 are all adapted to be in series and in series with the coil 9.

It will thus be seen that when the coils 17, 18 and 19 are all provided with current that the circuit through all of the pairs of contacts 35, 36 is closed and thus the coil 9 is energized. When however the current in any branch of this three phase circuit fails, the deënergization of any one of the coils 17, 18 and 19 will cause a deënergization of the coil 9, thus to permit the spring 10 to open the switch 7. The pairs of contacts 37 and 38 are in multiple with conductors 39 and 40 so that the deënergization of either one of the coils 17, 18 or 19 will short circuit the conductors 39 and 40. These conductors 39 and 40 are in series with the coil 31 and this local circuit receives its current from the conductors 23, 24. The local circuit including the coil 9 receives its current from the conductors 14 and 16 as illustrated.

From what has been described it is thought the general arrangement and advantages of my improved system will be readily apparent in that I am enabled to protect the apparatus upon failure of current in one leg of the three phase circuit only, or upon failure of the current in more than one leg.

I have, as stated, described just one form of carrying out my invention without intending to limit my invention thereto, but

Having thus described one form which my invention may take, what I claim as new and desire to secure by Letters Patent is:

1. A protective device for a multi-phase circuit having a switch element for all phases, electromagnetic means respectively for each phase and operatively actuated by a no-current condition of its allotted phase, means whereby the operative actuation of either electromagnetic means aforesaid causes said switch element to operate, a second switch element, a consumption circuit controlled thereby, means for supplying current to said consumption circuit from said multi-phase circuit, and means for operating the second switch element through the agency of either electromagnetic means aforesaid, to prevent injury to apparatus connected with said consumption circuit.

2. A protective device for a multi-phase circuit having a switch element for all phases, electromagnetic means respectively for each phase and operatively actuated by a no-current condition of its allotted phase, means whereby the operative actuation of either electromagnetic means aforesaid causes said switch element to operate, a second switch element, a consumption circuit controlled thereby, means for supplying current to said consumption circuit from said multi-phase circuit, and means for operating the second switch element through the agency of either electromagnetic means aforesaid to prevent injury to apparatus connected with said consumption circuit, said last aforesaid means including a plurality of pairs of contacts connected in bridge.

In witness whereof I hereunto subscribe my name this 2nd day of May, A. D., 1913.

NELS JOLEEN.

Witnesses:
HAZEL ANN JONES,
A. L. JONES.